(12) United States Patent
Gozdz et al.

(10) Patent No.: US 8,709,647 B2
(45) Date of Patent: Apr. 29, 2014

(54) BATTERY STRUCTURES AND RELATED METHODS

(75) Inventors: Antoni S. Gozdz, Marlborough, MA (US); Richard K. Holman, Belmont, MA (US); Andrew L. Loxley, Roslindale, MA (US); Ronnie Wilkins, Melrose, MA (US)

(73) Assignee: A123 Systems LLC, Livonia, MI (US)

( * ) Notice: Subject to any disclaimer, the term of this patent is extended or adjusted under 35 U.S.C. 154(b) by 329 days.

(21) Appl. No.: 13/299,562

(22) Filed: Nov. 18, 2011

(65) Prior Publication Data

US 2012/0214056 A1 Aug. 23, 2012

Related U.S. Application Data

(60) Division of application No. 12/140,058, filed on Jun. 16, 2008, now Pat. No. 8,088,512, which is a division of application No. 10/354,673, filed on Jan. 30, 2003, now Pat. No. 7,387,851, which is a continuation-in-part of application No. 10/206,662, filed on Jul. 26, 2002, now Pat. No. 7,579,112, and a continuation-in-part of application No. 10/021,740, filed on Oct. 22, 2001, now Pat. No. 7,553,584.

(60) Provisional application No. 60/308,360, filed on Jul. 27, 2001, provisional application No. 60/242,124, filed on Oct. 20, 2000.

(51) Int. Cl.
*H01M 10/02* (2006.01)
*H01M 4/04* (2006.01)

(52) U.S. Cl.
USPC ............... 429/189; 429/122; 429/249

(58) Field of Classification Search
USPC .................. 429/122, 189, 231.95, 249, 221
See application file for complete search history.

(56) References Cited

U.S. PATENT DOCUMENTS

| | | |
|---|---|---|
| 3,765,943 A | 10/1973 | Biagetti |
| 3,864,167 A | 2/1975 | Broadhead et al. |
| 4,245,016 A | 1/1981 | Rampel |
| 4,555,454 A | 11/1985 | Shuster |
| 4,599,114 A | 7/1986 | Atkinson |
| 4,615,784 A | 10/1986 | Stewart et al. |
| 4,668,596 A | 5/1987 | Shacklette et al. |

(Continued)

FOREIGN PATENT DOCUMENTS

| | | |
|---|---|---|
| CA | 2270771 A1 | 10/2000 |
| EP | 0071119 | 2/1983 |

(Continued)

OTHER PUBLICATIONS

"Defects" Unknown book chapter, p. 339-424.

(Continued)

*Primary Examiner* — Tracy Dove
(74) *Attorney, Agent, or Firm* — Wilmer Cutler Pickering Hale and Dorr LLP

(57) ABSTRACT

An electrochemical device includes a first electrode in electrical communication with a first current collector, a second electrode in electrical communication with a second current collector and a crosslinked solid polymer in contact with the first and second electrodes. At least one of the first and second electrodes includes a network of electrically connected particles comprising an electroactive material, and the particles of one electrode exert a repelling force on the other electrode when the first and second electrodes are combined with an uncrosslinked precursor to the solid polymer.

16 Claims, 3 Drawing Sheets

(56) References Cited

U.S. PATENT DOCUMENTS

| | | |
|---|---|---|
| 4,758,483 A | 7/1988 | Armand et al. |
| 4,889,777 A | 12/1989 | Akuto |
| 5,100,747 A | 3/1992 | Hayashida et al. |
| 5,187,209 A | 2/1993 | Hirai et al. |
| 5,213,895 A | 5/1993 | Hirai et al. |
| 5,227,267 A | 7/1993 | Goebel et al. |
| 5,294,504 A | 3/1994 | Otagawa et al. |
| 5,338,625 A | 8/1994 | Bates et al. |
| 5,399,447 A | 3/1995 | Chaloner-Gill et al. |
| 5,405,937 A | 4/1995 | Lemaire et al. |
| 5,436,093 A | 7/1995 | Huang et al. |
| 5,441,830 A | 8/1995 | Moulton et al. |
| 5,464,707 A | 11/1995 | Moulton et al. |
| 5,478,676 A | 12/1995 | Turi et al. |
| 5,518,833 A | 5/1996 | Repplinger et al. |
| 5,520,850 A | 5/1996 | Chaloner-Gill et al. |
| 5,527,641 A | 6/1996 | Koshiishi et al. |
| 5,554,459 A | 9/1996 | Gozdz et al. |
| 5,567,754 A | 10/1996 | Stramel |
| 5,578,396 A | 11/1996 | Fauteux et al. |
| 5,587,253 A | 12/1996 | Gozdz et al. |
| 5,588,971 A | 12/1996 | Fauteux et al. |
| 5,589,297 A | 12/1996 | Koga et al. |
| 5,591,544 A | 1/1997 | Fauteux et al. |
| 5,624,605 A | 4/1997 | Cao et al. |
| 5,635,138 A | 6/1997 | Amatucci et al. |
| 5,654,115 A | 8/1997 | Hasebe et al. |
| 5,677,080 A | 10/1997 | Chen |
| 5,698,342 A | 12/1997 | Klein |
| 5,705,291 A | 1/1998 | Amatucci et al. |
| 5,714,053 A | 2/1998 | Howard |
| 5,733,683 A | 3/1998 | Searson et al. |
| 5,759,714 A | 6/1998 | Matsufuji et al. |
| 5,789,100 A | 8/1998 | Burroughs et al. |
| 5,821,033 A | 10/1998 | Cromack et al. |
| 5,827,615 A | 10/1998 | Touhsaent et al. |
| 5,834,136 A | 11/1998 | Gao et al. |
| 5,840,087 A | 11/1998 | Gozdz et al. |
| 5,843,292 A | 12/1998 | Spiros |
| 5,846,675 A | 12/1998 | Sazhin et al. |
| 5,897,522 A | 4/1999 | Nitzan |
| 5,902,689 A | 5/1999 | Vleggaar et al. |
| 5,910,382 A | 6/1999 | Goodenough et al. |
| 5,925,283 A | 7/1999 | Taniuchi et al. |
| 5,949,213 A | 9/1999 | Lanni |
| 6,063,519 A | 5/2000 | Barker et al. |
| 6,063,525 A | 5/2000 | LaFollette |
| 6,069,221 A | 5/2000 | Chasser et al. |
| RE36,843 E | 8/2000 | Lake et al. |
| 6,096,453 A | 8/2000 | Grunwald |
| 6,096,454 A | 8/2000 | Tran et al. |
| 6,096,494 A | 8/2000 | Tang et al. |
| 6,117,593 A | 9/2000 | Stachoviak et al. |
| 6,120,940 A | 9/2000 | Poehler et al. |
| 6,136,476 A | 10/2000 | Schutts et al. |
| 6,156,453 A | 12/2000 | Shimizu et al. |
| 6,159,389 A | 12/2000 | Miura et al. |
| 6,174,623 B1 | 1/2001 | Shackle |
| 6,190,798 B1 | 2/2001 | Okada et al. |
| 6,231,779 B1 | 5/2001 | Chiang et al. |
| 6,280,875 B1 | 8/2001 | Kwak et al. |
| 6,280,879 B1 | 8/2001 | Andersen et al. |
| 6,287,720 B1 | 9/2001 | Yamashita et al. |
| 6,291,097 B1 | 9/2001 | Barker et al. |
| 6,300,016 B1 | 10/2001 | Jan et al. |
| 6,306,540 B1 | 10/2001 | Hiroi et al. |
| 6,322,924 B1 | 11/2001 | Hirahara et al. |
| 6,337,156 B1 | 1/2002 | Narang et al. |
| 6,342,317 B1 | 1/2002 | Patel et al. |
| 6,358,645 B1 | 3/2002 | Furukawa et al. |
| 6,395,429 B1 | 5/2002 | Kang et al. |
| 6,403,263 B1 | 6/2002 | Roach |
| 6,410,189 B1 | 6/2002 | Yamada et al. |
| 6,413,284 B1 | 7/2002 | Chu et al. |
| 6,413,285 B1 | 7/2002 | Chu et al. |
| 6,432,585 B1 | 8/2002 | Kawakami et al. |
| 6,451,487 B1 | 9/2002 | Besner et al. |
| 6,454,977 B1 | 9/2002 | Kwok et al. |
| 6,495,283 B1 | 12/2002 | Yoon et al. |
| 6,511,780 B1 | 1/2003 | Veregin et al. |
| 6,528,033 B1 | 3/2003 | Barker et al. |
| 6,555,268 B1 | 4/2003 | Inoue et al. |
| 6,599,662 B1 | 7/2003 | Chiang et al. |
| 6,645,675 B1 | 11/2003 | Munshi |
| 6,664,006 B1 | 12/2003 | Munshi |
| 6,730,438 B2 | 5/2004 | Nakanishi et al. |
| 6,753,111 B2 | 6/2004 | Kweon et al. |
| 6,764,525 B1 | 7/2004 | Whitacre et al. |
| 6,787,232 B1 | 9/2004 | Chiang et al. |
| 6,797,435 B2 | 9/2004 | Kweon et al. |
| 6,800,399 B2 | 10/2004 | Matsumoto |
| 6,818,356 B1 | 11/2004 | Bates |
| 6,844,105 B1 | 1/2005 | Hanafusa et al. |
| 6,855,273 B2 | 2/2005 | Ravet et al. |
| 6,878,487 B2 | 4/2005 | Cho et al. |
| 7,026,071 B2 | 4/2006 | Mayes et al. |
| 7,087,348 B2 | 8/2006 | Holman et al. |
| 7,090,785 B2 | 8/2006 | Chiang et al. |
| 7,318,982 B2 | 1/2008 | Gozdz et al. |
| 7,338,734 B2 | 3/2008 | Chiang et al. |
| 7,387,851 B2 | 6/2008 | Gozdz et al. |
| 7,553,584 B2 | 6/2009 | Chiang et al. |
| 7,579,112 B2 | 8/2009 | Chiang et al. |
| 7,662,265 B2 | 2/2010 | Chiang et al. |
| 7,763,382 B2 | 7/2010 | Riley, Jr. et al. |
| 7,781,098 B2 | 8/2010 | Chiang et al. |
| 8,088,512 B2 | 1/2012 | Gozdz et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0043709 A1 | 11/2001 | Panitzsch |
| 2002/0000034 A1 | 1/2002 | Jenson |
| 2002/0015278 A1 | 2/2002 | Fukuyama et al. |
| 2002/0028380 A1 | 3/2002 | Tanjo et al. |
| 2002/0036282 A1 | 3/2002 | Chiang et al. |
| 2002/0048706 A1 | 4/2002 | Mayes et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0192137 A1 | 12/2002 | Chaloner-Gill et al. |
| 2002/0195591 A1 | 12/2002 | Ravet et al. |
| 2003/0003352 A1 | 1/2003 | Kweon et al. |
| 2003/0008212 A1 | 1/2003 | Akashi et al. |
| 2003/0049529 A1 | 3/2003 | Cho et al. |
| 2003/0054250 A1 | 3/2003 | Kweon et al. |
| 2003/0082446 A1 | 5/2003 | Chiang et al. |
| 2003/0099884 A1 | 5/2003 | Chiang et al. |
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |
| 2004/0185343 A1 | 9/2004 | Wang et al. |
| 2004/0265692 A1 | 12/2004 | Long et al. |
| 2005/0026037 A1 | 2/2005 | Riley et al. |
| 2005/0034993 A1 | 2/2005 | Gozdz et al. |
| 2005/0175529 A1 | 8/2005 | Ceder et al. |
| 2005/0181280 A1 | 8/2005 | Ceder et al. |
| 2005/0272214 A1 | 12/2005 | Chiang et al. |
| 2006/0035143 A1 | 2/2006 | Kida et al. |
| 2006/0102455 A1 | 5/2006 | Chiang et al. |
| 2006/0234131 A1 | 10/2006 | Takami et al. |
| 2007/0009801 A1 | 1/2007 | Inagaki et al. |
| 2007/0275300 A1 | 11/2007 | Salot et al. |
| 2008/0099734 A1 | 5/2008 | Chiang et al. |
| 2008/0213662 A1 | 9/2008 | Chiang et al. |
| 2008/0254368 A1 | 10/2008 | Ooyama et al. |
| 2008/0311470 A1 | 12/2008 | Gozdz et al. |
| 2009/0035664 A1 | 2/2009 | Chiang et al. |
| 2009/0202903 A1 | 8/2009 | Chiang et al. |
| 2010/0003603 A1 | 1/2010 | Chiang et al. |
| 2010/0248028 A1 | 9/2010 | Riley, Jr. et al. |
| 2011/0005065 A1 | 1/2011 | Chiang et al. |

(56) References Cited

U.S. PATENT DOCUMENTS

| | | |
|---|---|---|
| 2011/0027656 A1 | 2/2011 | Chiang et al. |
| 2011/0045346 A1 | 2/2011 | Chiang et al. |
| 2011/0064999 A1 | 3/2011 | Chiang et al. |
| 2011/0070489 A1 | 3/2011 | Chiang et al. |
| 2011/0151324 A1 | 6/2011 | Chiang et al. |

FOREIGN PATENT DOCUMENTS

| | | | |
|---|---|---|---|
| EP | 1042832 A1 | 10/2000 | |
| EP | 1113511 A1 | 7/2001 | |
| EP | 1184918 A2 | 3/2002 | |
| EP | 1231651 A1 | 8/2002 | |
| EP | 1231653 A1 | 8/2002 | |
| EP | 1860722 A2 | 11/2007 | |
| GB | 976971 A | 12/1964 | |
| JP | 53-98038 | 8/1978 | |
| JP | 55010738 A | 1/1980 | |
| JP | 59094379 A | 5/1984 | |
| JP | 59152565 A | 8/1984 | |
| JP | 60183365 A | 9/1985 | |
| JP | 61-004167 A | 1/1986 | |
| JP | 63-121272 | 5/1988 | |
| JP | 63289768 A | 11/1988 | |
| JP | 04-58455 | 2/1992 | |
| JP | 04-144073 | 5/1992 | |
| JP | 0529006 | 2/1993 | |
| JP | 05041211 A | 2/1993 | |
| JP | 05109429 A | 4/1993 | |
| JP | 06-236768 | 8/1994 | |
| JP | 07101728 | 4/1995 | |
| JP | 07-153492 | 6/1995 | |
| JP | 07262986 A | 10/1995 | |
| JP | 08138650 A | 5/1996 | |
| JP | 09022693 | 1/1997 | |
| JP | 09147862 | 6/1997 | |
| JP | 09298057 A | 11/1997 | |
| JP | 9320569 A | 12/1997 | |
| JP | 11121006 A | 4/1999 | |
| JP | 11121025 A | 4/1999 | |
| JP | 11121061 A | 4/1999 | |
| JP | 11162519 A | 6/1999 | |
| JP | 2000-021415 | 1/2000 | |
| JP | 2000-048639 | 2/2000 | |
| JP | 2000-080406 | 3/2000 | |
| JP | 2000-173645 | 6/2000 | |
| JP | 2000195525 | 7/2000 | |
| JP | 2000195526 | 7/2000 | |
| JP | 2000-228213 | 8/2000 | |
| JP | 2000-248095 | 9/2000 | |
| JP | 2000344266 | 12/2000 | |
| JP | 2002151055 A | 5/2002 | |
| KR | 101991000746 | 9/1991 | |
| WO | WO-9705666 A2 | 2/1997 | |
| WO | WO-9744843 A1 | 11/1997 | |
| WO | WO-98/12761 A1 | 3/1998 | |
| WO | WO-98/16960 | 4/1998 | |
| WO | WO-99/33129 | 7/1999 | |
| WO | WO-99/56331 | 11/1999 | |
| WO | WO-00/41256 | 7/2000 | |
| WO | WO-01/77501 | 10/2001 | |
| WO | WO 02/43168 | 5/2002 | |
| WO | WO-03/012908 | 2/2003 | |
| WO | WO-03/056646 | 7/2003 | |
| WO | WO-2008011061 A1 | 1/2008 | |
| WO | WO-2008153749 A1 | 12/2008 | |

OTHER PUBLICATIONS

Aleshin et al. (1998) "Transport properties of poly (3,4-ethylenedioxythiophene/poly(styrenesulfonate)", Synthetic Metals, 94 pp. 173-177.
Allen, J "Electronically conductive Lithium Iron Phospho-olivines with Improved Electrochemical Performance," The Proceedings of the Electrochemical Society 2003:197-205.
Arbizzani et al, "Li1.01Mn1.974 surface modification by pol(3m4-Ethylenedioxithiophene)," J. Power Sources, 119-121: 695-700.
Arbizzani, et al., "Li$_{1.03}$Mn$_{1.97}$O$_4$ Surface Modification by Poly(3,4-ethylenedioxithiophene)", Poster Presented at the 11th International Meeting on Lithium Batteries, Monterey, California, Jun. 23-28, 2002, 1 page.
Armand et al. (1979)"Fast Ion Transport in Solids," Proceedings of the International conference on Fast ion Transport in Solids, Electrodes and Electrolytes, Lake Geneva, Wisconsin, p. 31.
Armand, et al., "Poly-Ethers as Solid Electrolytes", Fast Ion Transport in Solids: Electrodes and Electrolytes, Proceedings of the Intenational Conference on Fast Ion Transport in Solids, Electrodes and Electrolytes, Lake Geneva, Wisconsin, May 21-25, 1979, 7 pages.
Atomized, Merriam-Webster Online, 2 pages. Accessed Jul. 26, 2010.
Bouridah et al.(1985) "Poly(Dimethylsiloxane)-Poly(Ethylene Oxide) Based Polyurethane Networks Used as Electrolytes in Lithium Electrochemical Solid State Batteries," Solid State Ionics, 15 pp. 233-240.
Cantilever, Merriam-Webster Online, Accessed Jul. 19, 2010, 2 pages.
Chen et al. Reducing Carbon in LiFePO4/C Composite Electrodes to Maximize Specific Energy, Volumetric Energy, and Tap Density. J Electrochem Soc. 2002;148(9) A1184-89.
Chiang et al. (1999) High Capacity, Temperature-Stable Lithium Aluminum Manganese Oxide Cathodes for Rechargeable Batteries, Electrochem. Sol. St. Lett. 2(3), pp. 107-110.
Cho, et al. "Self-Assembling Colloidal-Scale Devices: Selectinv and Using Short-Range Surface Forces Between Conductive Solids". Adv. Funct. Matter 2007 17:379-389.
Compliant, Merriam-Webster Online, 2 pages. Accessed Jul. 16, 2010.
Dimension, Merriam-Webster Online, 2 pages. Accessed Jul. 14, 2010.
Displacement, Merriam-Webster Online, 2 pages. Accessed Jul. 16, 2010.
Ehrlich, "Chapter 35: Litium-Ion Batteries", p. 35.1, (2002), 1 page.
Elliot "Physics of Amorphous Materials" Longham Group Limited, 1983. 201 Pages.
EP Appln No. 01 988 312.3 Communication pursuant to Article 96(2) EPC mailed Mar. 9, 2005 (3 pgs).
French (2000) "Origins and Applications of London Dispersion Forces and Hamaker Constants in Ceramics" Journal of the American Ceramic Society, 83[9], 2117-46.
French et al. (1995) "Full Spectral Calculation of Non-Retarded Hamaker Constants for Ceramic Systems from Interband Transition Strengths," Solid State Ionics, 75, pp. 13-33.
Gaubicher, et al., "Li/.beta.-VOPO$_4$: A New 4 V System for Lithium Batteries", Journal of the Electrochemical Society, 146(12):4375-4379 (1999).
Ghosh et al. (1998) "Supramolecular Self-Assembly for Enhanced Conductivity in Conjugated Polymer Blends: Ionic Crosslinking in Blending of Poly(3,4-ethylenedioxythiophene)-Poly(styrenesulfonate) and Poly(vinylpyrrolidone)" Adv. Mater, 10:1097.
Gray (1991) "Solid Polymer Electrolytes: Fundamentals and Technological Applications," VCH, New York., 128 pages.
Hadziioannou "Negative Hamaker Coefficients" Colloid & Polymer Sci, 257, 413-419 (1979) (9 pgs).
Hart, R. et al, "3-D Microbatteries". Electrochemistry Communications, 5 (2003) pp. 120-123.
Hermetic, Merriam-Webster Online, 2 pages. Accessed Jul. 19, 2010.
Huang,et all., "Approaching Theoretical Capacity of LiFePO$_4$ at Room Temperature at High Rates", Electrochemical and Solid-State Letters, 4(10):A170-A172 (2001).
Idota et al. (1997) "Tin-Based Amorphous Oxide: A high Capacity Lithium-Ion-Storage Material" Science, 276, p. 1395.
Infuse, Meriam Webster Online, Accessed Jul. 19, 2010, 2 pages.
Interface, Merriam-Webster Online, 2 pages. Accessed Jul. 15, 2010.
Internatinal Preliminary Examination Report for PCT/US02/23880 mailed Mar. 14, 2007. 3 pages.

(56) References Cited

OTHER PUBLICATIONS

International Preliminary Examination Report for PCT/US01/48345, mailed Feb. 25, 2004 (7 pages).
International Preliminary Report on Patentability for PCT/US2008/006604 mailed Dec. 1, 2009. 15 pages.
International Search Report for PCT/US2008/06604 mailed Nov. 3, 2008. 8 pages.
International Search Report for PCT/US2009/000901 mailed Sep. 11, 2009. 3 pages.
International Search Report for US09/006284 mailed Jun. 7, 2010. 7 pages.
International Search Report, International Patent Application No. PCT/US01/48345, mailed Feb. 20, 2003 (9 pages).
Intervening, Merriam-Webster Online, 2 pages. Accessed Jul. 19, 2010.
Kuwabata et al. (1999) "Charge-discharge properties of composites of LiMn2O4 and polypyrrole as positive electrode materials for 4 V class of rechargeable Li Batteries" Electrochimica Acta, 44:4593-4600.
LeCras, F. et al., (1996) "Lithium intercalation in Li-Mg-Mn-O and Li-Al-Mn-O spinets," Solid State Ionics, 89 pp. 203-213.
Li, et al., "Mixed (Electronic and Ionic) Conductive Solid Polymer Matrix, 1: Synthesis and Properties of poly(2,5,8,11,14,17,20,23-octaoxa-pentacosyl methacrylate)-block-poly(4-vinylpyridine)", Makromol. Chem., 192:3043-3050 (1991).
Limthongkul et al. (2001) "Nanocomposite Li-Ion Battery Anodes Produced by the Partial Reduction of Mixed Oxides," Chem. Mater, 13, pp. 2397-2402.
Linden (1995) "Handbook of Battereis" Second Edition, McGraw-Hill, Inc., p. 2.19.
Long "Three-Dimensional Battery Architectures" Chem. Rev. 104:4463-4492 (2004).
Matsumoto et al. (1992) "Vaporization of Graphite in Plasma Arc and Identification of C60 in Deposit," J. Electrochem. Soc., vol. 139 No. 1., pp. L8-L9.
Matsumoto, et al., "Ionic Conductivity of Dual-Phase Polymer Electrolytes Compriesd of NBR/SBR Latex Films Swollen with Lithium Salt Solutions", Technical Papers: Electrochemical Science and Technology, J. Electrochem. Soc., 141(8):1989-1993 (1994),7 pages.
Mazouzi, et al., "High Capacity and Excellent Cyclability of Nano-Silicon/CB/CMC Composite Anode fromTailored Electrode Prepararatin", 26th Electrochemical Society Meeting, Abstract 417 (2009), 1 page.
Milling et al. (1996) "Direct Measurement of Repulsive van der Waals interactions using an Atomic Force Microscope" Journal of Colloid and Interface Science, 180, pp. 460-465.
Minnet et al. (1988), "Polymeric Insertion Electrodes," Solid State Ionics, 28-30 1192-1196.
Nagaoka et al., "High Ionic Conductivity in Poly(dimethyl Siloxane-co-Ethylene Oxide) Dissolving Lithium Perchlorate," Dept of Chemistry, Sophia University, pp. 659-663.
Ohzuku et al. (1995) Synthesis and Characterization of LiAL1/4Ni3/4O2 for Lithium-Ion (Shuttle Cock) Batteries, J. Electrochem. Soc., vol. 143, p. 4033.
Open-Cell Foam, McGraw-Hill Dictionary of Scientific and Technical Terms, (1974), 3 pages.
Padhi, et al., "Phospho-olivines as Positive-Electrode Materials for Rechargeable Lithium Batteries", J. Electrochem. Soc., 141(4):1187-1194 (1997).
Percolating, Merriam-Webster Online, 2 pages, Accessed Jul. 16, 2010.
Pierson, "Chapter 6: Vitreous Carbon", Handbook of Carbon, Graphite, Diamond and Fullernes—Properties, Processing and Applications, William Andrew Publishing, pp. 122-140 (1993), 20 pages.
Polymerization, Merriam-Webster Online, 2 pages. Accessed Jul. 16, 2010.
Ravet et al. Electroactivity of Natural and Synthetic Triphylite. J Power Sci. 2001 97-98; 503-507.
Ravet. et al, "Improved Iron Based Cathode Material", Abstract No. 127, 1 page.
Reed, Introduction to the Principles of Ceramic Processing, John Wiley & Sons, Inc., pp. 86-89 (1988).
Rheological, Merriam-Webster Online, 2 pages. Accessed Jul. 26, 2010.
Settle, Merriam-Webster Online, 2 pages. Accessed Jul. 19, 2010.
Tarascon, et al,. "Issues and Challenges Facing rechargeable Lithium Batteries", Nature, 415:359-367, (2001).
Thermoplastic, Merriam-Webster Online, 2 pages. Accessed Jul. 26, 2010.
Tukamoto, et al., "Electronic Conductivity of $LiCoO_2$ and Its Enhancement by Magnesium Doping", Technical Papers: Solid-State Science and Technology, J. Electrochem. Soc., 144(9):3164-3168 (1997).
Van Oss "Applications of Net Repulsive Van Der Waals Forces Between Different Particles, Macromolecules or Biological Cells in Liquids," Colloids and Surfaces 1:45-56 (1980).
Van Oss et al. (1977) "Comparison Between Antigen-Antibody Binding Energies" Imunnunol. Comm., 6(4), pp. 341-354.
Van Oss et al. (1979) "Repulsive Van Der Waals Foces" Imunnunol. Comm., (8)1, pp. 11-29.
Van Oss et al. (1979) "Repulsive van der Waals Forces" Separation Sci. Tech. 14(4), pp. 305-317.
Viscosity. Merriam Webster Dictionary. 2 pages. Accessed Jul. 15, 2010.
Wang et al. (2002) "All Solid State $LI/Li_xMnO_2$ Polymer Battery Using Ceramic Modified Polymer Electrolytes", Journal of Electrochem. Soc. 149 (8), A967.
Written Opinion for PCT/US01/48345, mailed Aug. 22, 2003 (7 Pages).
Written Opinion for PCT/US2008/006604 mailed Nov. 3, 2008. 14 pages.
Yamada, et al., "Optimized $LiFePO_4$ for Lithium Battery Cathodes", Journal of the Electrochemical Society, 148(3):A224-A229 (2001).
Yamada, et al., Crystal Chemistry of the Olivine-Type $Li(Mn_yFe_{1-y})PO_4$ and $(MN_yFe_{1-y})PO_4$ as Possible 4 V Cathode Materials for Lithium Batteries, Journal of the Electrochemical Society, 148(8):A960-A967 (2001).
Zallen, (1983) "The Physics of Amorphous Materials," J. Wiley & Sons, N.Y.

BATTERY STRUCTURES AND RELATED METHODS

RELATED APPLICATIONS

This application is a divisional of U.S. patent application Ser. No. 12/140,058, filed Jun. 16, 2008, which is a divisional of U.S. patent application Ser. No. 10/354,673, filed Jan. 30, 2003, now U.S. Pat. No. 7,387,851, which is a continuation-in-part of U.S. patent application Ser. No. 10/206,662, filed Jul. 26, 2002, now U.S. Pat. No. 7,579,112, which is a continuation-in-part of U.S. patent application Ser. No. 10/021,740 filed Oct. 22, 2001, now U.S. Pat. No. 7,553,584, which claims priority to U.S. Provisional Application No. 60/241,124, filed Oct. 20, 2000. U.S. patent application Ser. No. 10/206,662, filed Jul. 26, 2002, now U.S. Pat. No. 7,579,112, also claims priority to U.S. Provisional Application No. 60/308,360, filed Jul. 27, 2001. All of these applications are incorporated herein by reference.

BACKGROUND OF THE INVENTION

1. Field of the Invention

The present invention relates generally to bipolar devices and methods of making such structures. The present invention also relates to self-organizing devices, and more particularly to combinations of materials that can spontaneously form networks resulting in bipolar devices, and methods thereof.

2. Description of the Related Art

Rechargeable batteries enjoy an enormous and constantly growing global market due to their implementation in, for example, cellular telephone, laptop computers and other consumer electronic products. In addition, the development of electrically powered vehicles represents an immense potential market for these batteries.

The lithium rechargeable battery is an attractive technology due to its comparatively high energy density, low potential for environmental and safety hazard, and relatively low associated materials and processing costs. The lithium battery is charged by applying a voltage between the battery's electrodes, which causes lithium ions and electrons to be withdrawn from lithium hosts at the battery's cathode. Lithium ions flow from the cathode to the battery's anode through an electrolyte to be reduced at the anode, the overall process requiring energy. Upon discharge, the reverse occurs; lithium ions and electrons are allowed to re-enter lithium hosts at the cathode while lithium is oxidized to lithium ions at the anode, an energetically favorable process that drives electrons through an external circuit, thereby supplying electrical power to a device to which the battery is connected.

Currently known cathode storage compounds such as $LiCoO_2$ and $LiMn_2O_4$ when used with currently known anodes such as lithium metal or carbon have working voltages between 3 and 4V. For many applications a high voltage and low weight are desirable for the cathode as this leads to high specific energy. For example, for electrical vehicle applications the energy-to-weight ratio of the battery determines the ultimate driving distance between recharging.

Cathodes in state-of-the-art rechargeable lithium batteries contain lithium ion host materials, electronically conductive particles to electronically connect the lithium ion hosts to a current collector (i.e., a battery terminal), a binder, and a lithium-conducting liquid electrolyte. The lithium ion host particles typically are particles of lithium intercalation compounds, and the electronically conductive particles are typically made of a substance such as a high surface area carbon black or graphite. The resulting cathode includes a mixture of particles of average size typically on the order of no more than about 10 to 30 microns.

Anodes for rechargeable lithium-ion batteries typically contain a lithium host material such as graphite, electronically conductive particles to electronically connect the lithium ion hosts to a current collector (i.e., a battery terminal), a binder, and a lithium conducting liquid electrolyte. Alternatives to graphite or other carbons as the lithium ion host have been described by Idota et al., in *Science* 1997, 276, 1395, and by Limthongkul et al., in "Nanocomposite Li-Ion Battery Anodes Produced by the Partial Reduction of Mixed Oxides," *Chem. Mat.* 2001.

In such cathodes or anodes, for reliable operation, good contact between particles should be maintained to ensure an electronically conductive pathway between lithium host particles and the external circuit, and a lithium-ion-conductive pathway between lithium host particles and the electrolyte.

A solid polymer electrolyte is used as the ion conduction medium between the anode and cathode in some applications. A typical solid polymer electrolyte is composed of polymers having electron-donating atoms such as oxygen, nitrogen and phosphorus, together with a complex of lithium salt. Armand et al., in "*Fast Ion Transport in Solids*", P. Vashishta, J. N. Mundy and G. K. Shenoy, Eds., North-Holland, Amsterdam (1979), p.131, describe the use of poly(ethylene oxide) and other polyethers doped with various alkali metal salts as solid polymer electrolytes for battery applications. Subsequently, a great variety of ionically conductive solid polymer electrolytes based on a variety of lithium-ion complexing polymers have been reported (see, e.g., F. M. Gray, "*Solid Polymer Electrolytes: Fundamentals and Technological Applications*", VCH, New York (1991)). More recently, detailed performance characteristics of an all-solid-state $Li_xMnO_2$/Li polymer battery system were reported by Sakai et al., in the *Journal of Electrochem. Soc.* 149 (8), A967 (2002).

The ion conductivity of the solid polymer electrolyte is usually increased as the segmental motion of the polymer chain in increased. Therefore, the crystalline region within the polymer structure has to be minimized to increase the non-crystalline regions. Furthermore, linear or branched solid polymer electrolytes demonstrate poor mechanical properties. The mechanical properties of the polymer are shown to improve when the polymer chains are crosslinked.

SUMMARY OF THE INVENTION

In one aspect of the invention, an electronic device is described. The device includes a first electrode in electrical communication with a first current collector, a second electrode in electrical communication with a second current collector, and a crosslinked solid polymer in contact with the first and second electrodes. At least one of the first and second electrodes is comprised of a network of electrically connected particles including an electroactive material, and the particles of at least one electrode exert a repelling force on the other electrode when the first and second electrodes are combined with an uncrosslinked precursor to the solid polymer.

The electronic device is a device that has two conductive electrodes and a separating medium between the two electrodes. The separating medium can be ionically conducting or insulating. Examples of electronic devices include batteries, capacitors, diodes, and photovoltaics.

The electrochemical device can be a self-organized device, such as the self-organized battery system (SBS) described in co-pending application U.S. Ser. No. 10/206,662, which is incorporated herein by reference. A polymer electrolyte precursor is used in the assembly of the device, which is then crosslinked to form a solid polymer electrolyte. The crosslinked ionically conductive polymeric material can serve as the electrolyte as well as an in situ formed separator in the electrochemical device.

In another aspect of the invention, a method for making an electronic device is provided. The method includes combining first particles, second particles and a liquid polymer precursor to a solid polymer, where the first and second particles are selected to exert a repelling force on each other when combined with the polymer precursor. At least a portion of the first particles are segregated into a first spatial region that is essentially free of the second particles to form a network of electrically-connected first particles to form a first electrode. At least a portion of the second particles are segregated into a second spatial region that is essentially free of the first particles to form a network of electrically-connected second particles to form the second electrode. The polymer precursor is in communication with both the first and second electrodes, and the polymer precursor is then crosslinked to form a solid polymer. The polymer can be insulating or ionically conducting.

In another aspect of the invention, a method for making an electronic device is provided. The method includes applying a composition comprising first particles and a liquid polymer precursor to a solid polymer onto a first electrode surface. The first particles are selected to exert a repelling force against the first electrode surface when combined with the polymer precursor. At least a portion of the first particles are segregated into a first spatial region that is essentially isolated from the first electrode surface to form a second electrode, wherein the polymer precursor is in communication with both the first and second electrodes. The polymer precursor is then crosslinked to form a solid polymer. The polymer can be insulating or ionically conducting.

The precursor to the solid polymeric material is chosen such that the interaction between appropriate first and second electrodes, i.e., the anode and the cathode, is repulsive and the interaction between like particles (anode-anode or cathode-cathode interaction) is attractive, thereby providing electrical connection between like particles, while maintaining physical separation and thus electronic isolation between the anode and cathode materials. The polymer precursor has sufficiently low viscosity prior to crosslinking that the mixture of this liquid and the dispersed active particles is processable, i.e. can be tape cast, coated, extruded, etc. In addition, it is of a viscosity that permits self-organization of the first and second particles.

Selection of suitable polymer precursors is guided in part by the relationship between refractive index and London dispersion forces of the device components, namely that for materials 1 and 3 in medium 2, a repulsive interaction is expected between materials 1 and 3 when the relative refractive indices, n, are such that $n_1 < n_2 < n_3$ or $n_1 > n_2 > n_3$. Thus, repulsion between anode and cathode is expected when the refractive index of the liquid polymer precursor is intermediate between those of the anode and cathode materials.

In one or more embodiments, the ionic conductivity of the crosslinked solid polymer electrolyte is sufficient to provide the required performance in the electrochemical device, e.g., an SBS battery or other self-organized bipolar electrochemical device. In other embodiments, a liquid electrolyte or additive is combined with the solid polymer electrolyte to provide ionic conductivity at a level required for performance of the device as an SBS battery or other self-organized bipolar electrochemical device.

In both cases the mechanical stability of the electrolyte layer is such that the cathode network does not come in contact with the anode network after many charge-discharge cycles. In both cases the electrochemical stability of the electrolyte layer is such that the impedance of the cell does not significantly increase after many charge-discharge cycles.

As used herein, the term "about" is used to mean approximately, in the region of, roughly, or around. When the term "about" is used with a numerical range, it modifies that range by extending the boundaries above and below the numerical values set forth. In general, the term "about" is used herein to modify a numerical value above and below a stated value by 20%.

As used herein, the recitation of a numerical range for a variable is intended to convey that the invention may be practiced with the variable equal to any of the values within that range. Unless specifically indicated otherwise, the word "or" is used in the "inclusive" sense of "and/or" and not the "exclusive" sense of "either/or."

BRIEF DESCRIPTION OF THE DRAWING

Preferred, non-limiting embodiments of the present invention will be described by way of examples with reference to the accompanying figures, in which.

DETAILED DESCRIPTION OF THE INVENTION

A lithium ion battery will be used to generally describe the various aspects of the present invention. The description of such a lithium ion bipolar device is meant to be exemplary and the use of the various features and aspects of the present invention to other systems is considered to be within the scope of the present invention. Self-organizing particulate structures can be used for energy storage or energy conversion systems including, but not limited to, primary (disposable) and secondary (rechargeable) batteries, capacitors, diodes, and hybrid electrochemical capacitors.

Figure 1:
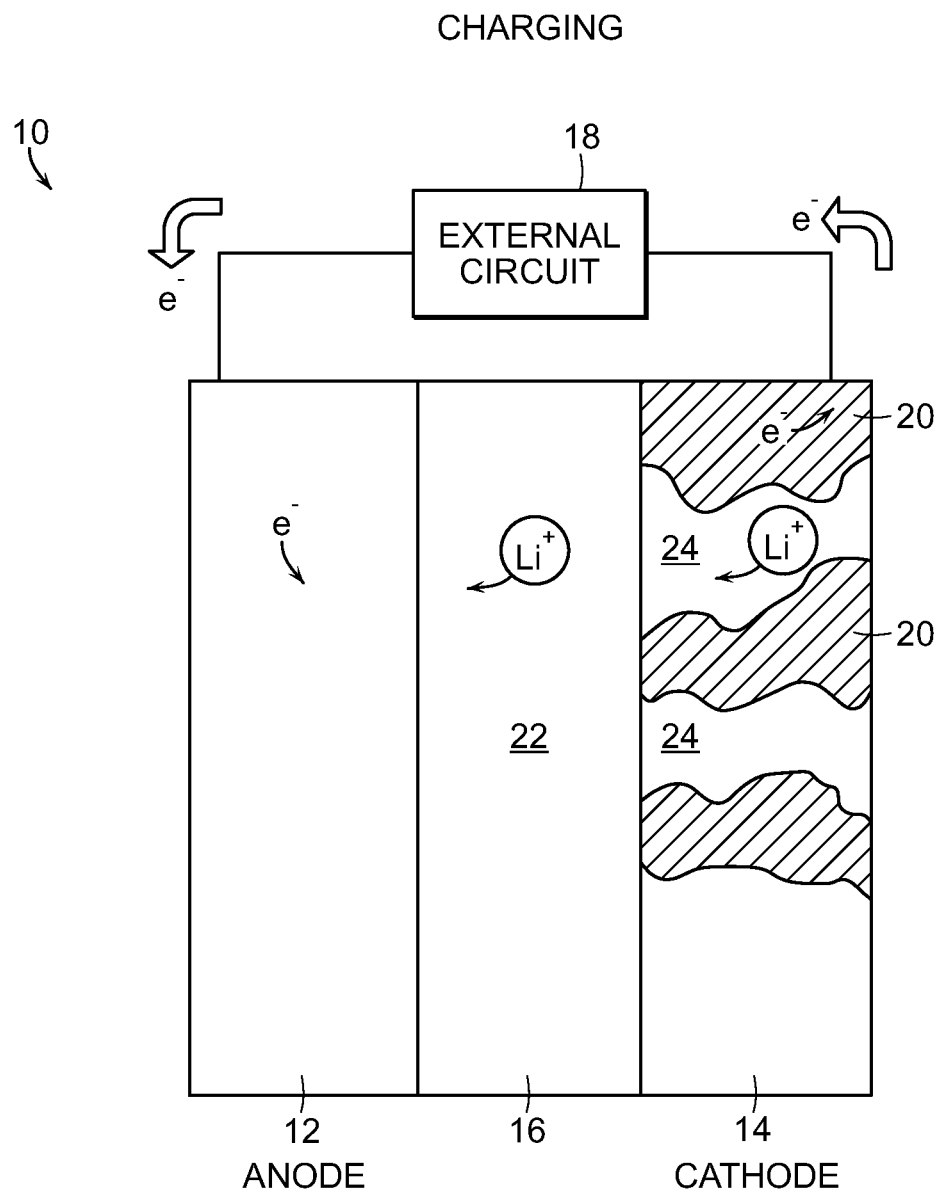
FIG. 1 is a schematic illustration of a conventional anode/cathode, shown here in charging mode.

A conventional bipolar device is schematically depicted in FIG. 1. The bipolar device 10 can be an energy storage system having a cathode 14 and anode 12 that are spaced apart from each other by spacer region 22 containing an electrolyte 16. A carbonaceous conducting additive and an electrolyte material are added to the energy storage material, e.g., lithium cobalt oxide, to improve the electronic and ionic conductivity, respectively.

The lithium battery can be charged by applying a voltage between the electrodes 12 and 14, which causes lithium ions and electrons to be withdrawn from lithium hosts at the battery's cathode. Lithium ions flow from cathode 14 to anode 12 through ionically conductive region 24 of the cathode and through the electrolyte 16 to be reduced at the anode. During discharge, the reverse occurs; lithium ions and electrons enter lithium hosts 20 at cathode 14 while lithium is oxidized to lithium ions at anode 12, which is typically an energetically favorable process that drives electrons through an external circuit 18, thereby supplying electrical power to a device to which the battery is connected. For improved operation, the electrode should provide fast transport for both electrons and lithium ions.

The electrode structures described herein can be fabricated using self-organization. The selection of materials that exert attracting and repelling forces on one another produces self-organizing structures, specifically, self-organizing bipolar devices. A "repelling" or "repulsive" force is understood to mean a surface force that isolates the anode and cathode components from one another. The anode and cathode materials are isolated by an intervening or wetting layer of at least molecular dimensions (greater than about 1 nm) of the electrolyte. Surface forces can be used to self-organize a wide range of electrochemical devices described herein including, for example, batteries, capacitors, electrochromics, fuel cells, diodes and hybrid devices.

The principle for using surface forces in the organization of bipolar devices is first described. Van der Waals (vdW) forces between molecules and condensed phases are composed of at least three contributions, a Keesom force due to interactions between oriented permanent dipoles, a Debye force due to polarization induced in other molecules by a permanent dipole, and a London dispersion force due to polarization induced in other molecules by oscillations in the electron cloud of interatomic bonds. Of these, the London dispersion force is the most universal since it does not require the existence of permanent dipoles. In most systems, it is the dominant contribution to the vdW force. While dispersion forces can be relatively weak and long-range, their impact is not negligible.

An important parameter scaling the dispersion force is the Hamaker constant A. For symmetric combinations of two materials, e.g., two plane-parallel surfaces of material 1 separated by a uniform thickness of material 2, or vice versa, the Hamaker constant $A_{121}=A_{212}$ is always positive, leading to an attractive dispersion force ($F_{vdW}<0$). For asymmetric combinations, e.g., two plane-parallel surfaces of materials 1 and 3 separated by a uniform thickness of material 2, the dispersion force can be either attractive or repelling. The repelling case arises where $A_{123}<0$ and $F_{vdW}>0$.

The magnitude of the dispersion force can be determined from careful measurements of surface forces such as atomic force microscopy (AFM) or from various approximations using physical properties of the materials involved. Recently, rigorous calculations of Hamaker constants using Lifshitz theory have become possible due to measurements of the spectral optical properties of materials over a very wide frequency range from the IR to deep UV. See, for example, "Full Spectral Calculation of Non-Retarded Hamaker Constants for Ceramic Systems from Interband Transition Strengths," *Solid State Ionics*, 75, 13-33 (1994) and *J. Am. Ceram. Soc.*, 83[9], 2117-46 (2000), which are incorporated herein by reference.

For most materials and especially low refractive index materials (n<2), the dominant interactions occur in the optical frequency range, and the Hamaker constant $A_{123}$ can be approximated to good accuracy using optical index and static dielectric constant approximations, a widely used form of which is:

$$A_{123} \equiv \frac{3}{4}kT\left(\frac{E_1-E_2}{E_1+E_2}\right)\left(\frac{E_3-E_2}{E_3+E_2}\right) + \frac{3}{8}\frac{hv_e}{\sqrt{2}}\frac{(n_1^2-n_2^2)(n_3^2-n_2^2)}{(n_1^2+n_2^2)^{1/2}(n_3^2+n_2^2)^{1/2}\{(n_1^2+n_2^2)^{1/2}+(n_3^2+n_2^2)^{1/2}\}}$$

The electronic frequency $v_e$ corresponds to the mean ionization frequency of the materials present, and is typically about $3\times10^{15}$ Hz. k is the Boltzmann's constant and h Plank's constant. The refractive indices in the visible range for mediums 1, 2, and 3 are $n_1$, $n_2$, and $n_3$, respectively. $E_1$, $E_2$, $E_3$ are the static relative dielectric constants. When the indices are ordered as $n_1>n_2>n_3$ or $n_1<n_2<n_3$, $A_{123}$ is negative. Thus, the sign and magnitude of the Hamaker constant can be readily estimated from optical and dielectric data, while more precise quantification, where necessary, is possible with full-spectral methods. See, U.S. Ser. No. 10/206,662 for further detail.

In a self-organizing battery system, a first electrode material, a second electrolyte material and a third electrode material are selected in combination such that the first electrode material exerts self-attractive forces, the third electrode material exerts self-attractive forces, while the first and third electrode materials exert a mutually repelling force when they are separated by the electrolyte or its precursor. The relative forces of the system are generally predicted using the refractive indices of the component materials. In some instances other more precise techniques for determining surface forces may be used. For example, atomic force microscopy may be used to determine surface forces.

Figure 2:
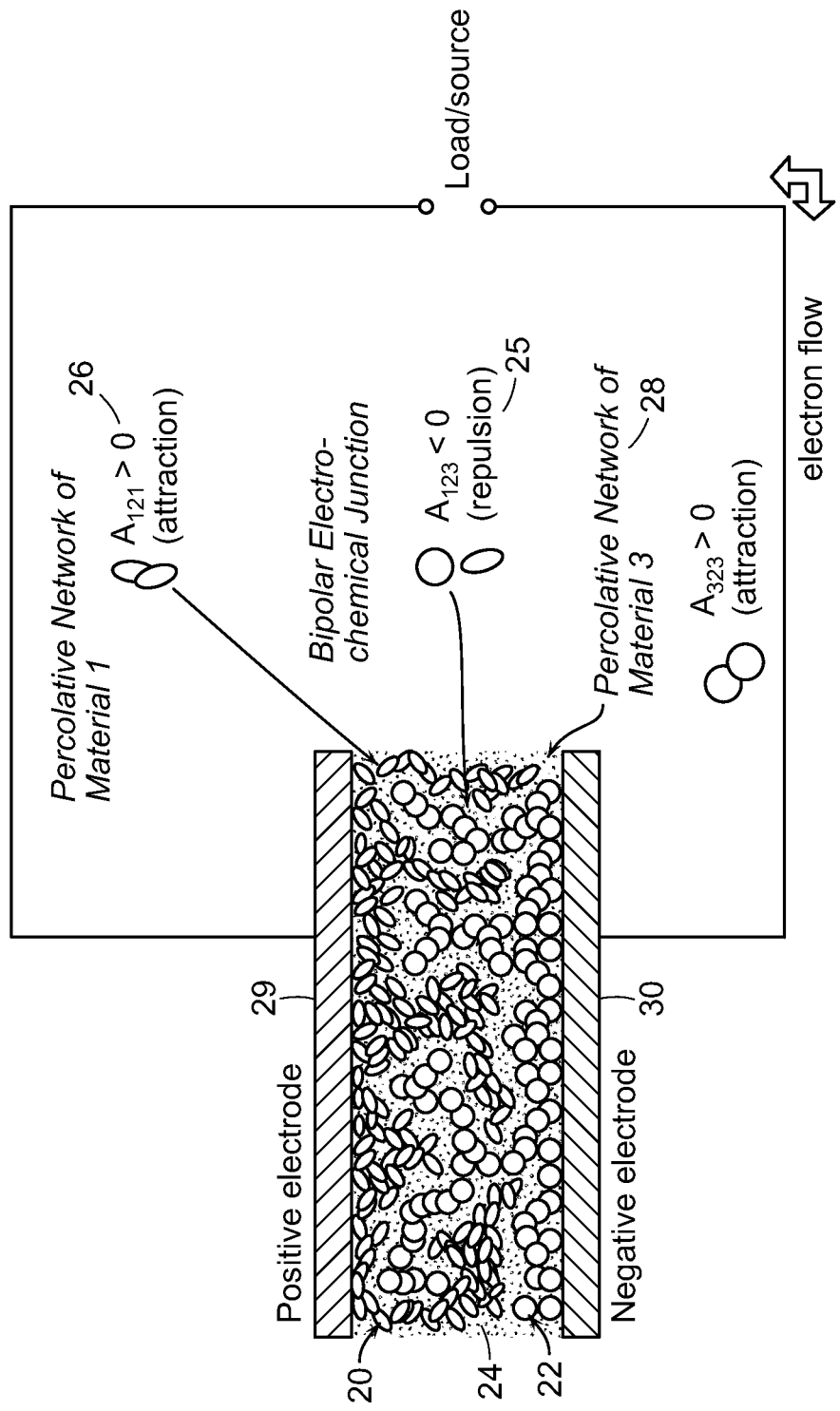
FIG. 2 is a schematic illustration showing a self-organizing bipolar device according to one or more embodiments of the present invention.

This principle is illustrated in FIG. 2, where two dissimilar materials, material 1 (20) and material 3 (22) are separated by a medium 2 (24). The vdW interaction can be rendered repelling through the judicious selection of materials (characterized by a negative Hamaker constant $A_{123}$) (25). The vdW interaction between particles of like material separated by any other medium is typically attractive. Therefore, particles 1 and 3 in FIG. 2 experience a vdW attraction (26, 28) to particles of their own kind. At a sufficiently high volume fraction of such particles and in the absence of unwanted coulombic or steric repulsion, percolative contact between like particles can occur. If the particles are individually electronically conductive, a continuous electronically conducting network results. Thus in battery systems, where the volume fraction of each storage compound should be maximized for maximum energy density, a percolative network of materials 1 and 3 can form naturally from the minimum volume of material, whereby material 1 is separated from material 3 by material 2. The anode and cathode materials also each make contact to their respective current collectors (29, 30), as shown in FIG. 2. The resultant system is a self-organizing, co-continuous, interpenetrating microstructure in which an electrode is continuously "wired" to a current collector and another electrode to another current collector, while the repelling dispersion force is used to ensure electronic isolation of the two phases from one another. Exemplary devices include writable microbatteries, spin-on flat batteries, printable thick-film batteries and bulk storage batteries.

A continuum of structures can be created from an initially homogeneous mixture of materials 1, 2, and 3. If (i) the mixture is cured over relatively long periods of time, (ii) the solids loading is relatively low, (iii) the viscosity of material 2 is relatively low, or (iv) the density contrast is relatively high, then the magnitude of segregation on the length scale of the thickness of the device can be high, thereby providing highly segregated branched structures well suited for use as electrodes.

When used as a battery, the separating medium is an electrolyte, and the electrolyte is ion conducting, but electronically insulating. During processing and self-organization of the device, the electrolyte is of low viscosity so that electrode materials are free to self-organize.

In co-pending application U.S. Ser. No. 10/206,662, polymer electrolytes or binders are dissolved in solvents to achieve the necessary viscosity for self-organization. In addition, the net index of the solvent plus polymer is intermediate between anode and cathode. Alternatively, a solid polymer electrolyte with refractive index intermediate between the anode and cathode is melt-processed. The solvent based requires removal of the solvent after assembly, giving rise to issues associated with drying time/energy costs, solvent retrieval/disposal or recycling. The potentially significant volume changes and drying stresses upon loss of the solvent can lead to electrical shorts between anode and cathode. Alternatively, in melt processing of a solid polymer electrolyte there is typically a tradeoff between limiting the amount of crystallinity (to maximize ionic conductivity) while maintaining high temperature structural stability, particularly when the electrolyte is also serving as a structural member (as is the case in the current invention.) The use of high molecular weight polymers improves the elevated temperature stability (elevated temperature being between 40 and 80° C.), but at the expense of ease of processability due to high melt viscosities.

In many applications, it is desired that the electrolyte be a solid polymer electrolyte. The solid polymer electrolyte acts as a microscale separator having sufficient ionic conductivity for the operation of the device. However, typical solid polymer electrolytes, even transformed into a melt at elevated temperatures, are of too high a viscosity for effective self-organization of the component electrode particles.

It has been discovered that a liquid polymer, oligomer, or monomer electrolyte precursor to a solid polymer electrolyte or binder can be used in the manufacture of an electrochemical device using self-organization of the device components. The use of a low molecular weight precursor provides low viscosity prior to crosslinking as well as good elevated temperature structural stability in the final self-organized battery structure, which is bound and electrically isolated by the in-situ crosslinked polymer electrolyte matrix. In one or more embodiments, the polymer electrolyte precursor is a liquid at room temperature. In one or more embodiments, the precursor has a viscosity of less than about $10^5$ cP, or of less than about $10^3$ cP, or even of less than about $10^2$ cP before crosslinking.

The polymer electrolyte precursor is combined with particles to be used in the organization of an electrically connective network to form an electrode. The solids content of the resultant slurry or dispersion is sufficient to provide a percolative pathway of like particles, e.g., 10-80 wt % solids content. The viscosity of the slurry or dispersion provides a processable mixture, i.e., it can be cast, coated or extruded or deposited onto a surface. The composition has a viscosity of less than about $10^6$ cP, or of less than about $10^5$ cP, or even of less than about $10^3$ cP. A solvent may be added to the polymer electrolyte precursor to improve processability, by for example lowering the viscosity of the slurry, improving the repulsive characteristics, i.e., altering the refractive index, or enhancing the solubility of a salt. Once crosslinked, the crosslinked solid polymer electrolyte has an ionic conductivity sufficient for the device to function as an electrochemical cell. In some embodiments, swelling of the crosslinked solid polymer electrolyte with a liquid electrolyte to increase ionic conductivity is contemplated, but not required.

Figure 3:
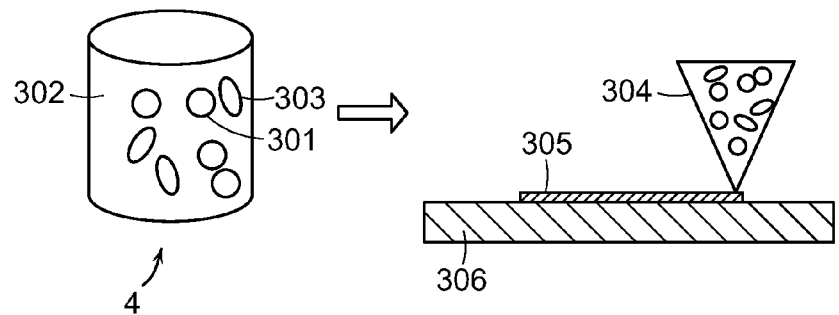
FIG. 3 illustrates the fabrication of a self-organizing electrochemical device.

A method of preparing an electrochemical device is described with reference to FIG. 3. In practice, a salt (Li salt for a Li-ion battery system) and, if necessary, an appropriate initiator are dissolved in the polymer electrolyte precursor 302. The appropriate anode materials 301 and cathode materials 303 are dispersed in the crosslinkable liquid polymer electrolyte precursor 302, and cast from applicator 304 as a film 305 onto at least one current collector 306 selected or prepared such that the current collector 306 experiences an attractive interaction with the cathode materials 301 and a repulsive interaction with the anode materials 303. A second current collector (not shown) may be applied to the upper surface, which experiences a repulsive interaction with the cathode and an attractive interaction with the anode. Sufficient time is given to allow self organization to take place, i.e. electrical connection via particle motion of the cathode particles to each other and the cathode current collector, and of the anode particles to each other and the anode current collector, as well as separation (and thus electrical isolation) between the anode and cathode particles. Concurrent with or after self-organization, crosslinking of the polymer electrolyte precursor is carried out, e.g. by (but not limited to) thermal or radiation-induced crosslinking.

Figure 4:
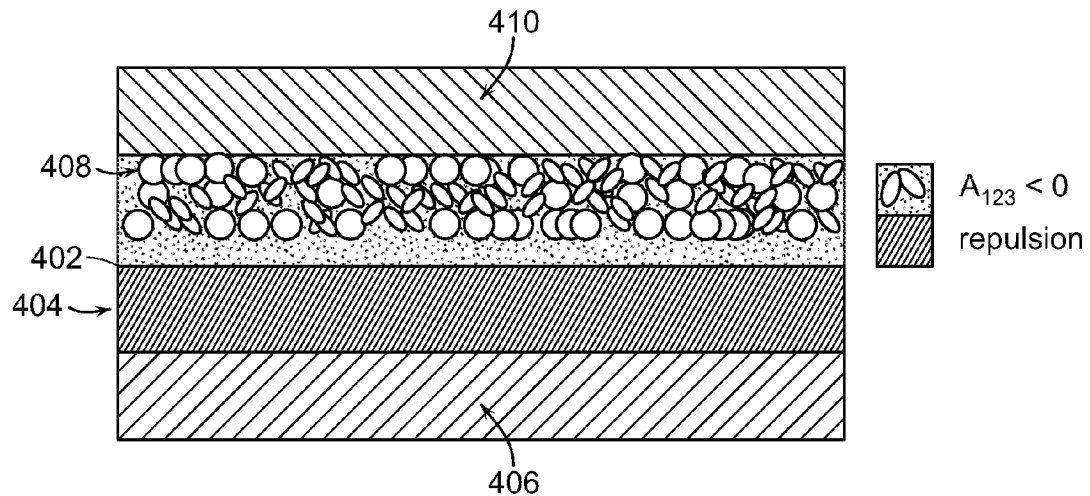
FIG. 4 illustrates the fabrication of a self-organizing electrochemical device.

An alternative electrochemical device and a method of its preparation are described with reference to FIG. 4. A salt and, if necessary, an appropriate initiator are dissolved in the polymer electrolyte precursor 402. An active material 404, e.g., a cathode, is deposited on a current collector 406 as a film or other structure. The appropriate active material 408, e.g., anode materials are dispersed in the crosslinkable liquid polymer electrolyte precursor 402, and cast onto the active material structure 404. The current collector 406 is selected or prepared such that the current collector 406 experiences an attractive interaction with the cathode materials 404 and a repulsive interaction with the anode materials 408. A second current collector 410 may be applied to the upper surface, which experiences a repulsive interaction with the cathode and an attractive interaction with the anode. Sufficient time is given to allow self-organization to take place, i.e. electrical connection via particle motion of the anode particles to each other and the anode current collector, as well as separation (and thus electrical isolation) between the anode particles and cathode structure. Concurrent with or after self-organization, crosslinking of the polymer electrolyte precursor is carried out, e.g. by (but not limited to) thermal or radiation-induced crosslinking.

In one or more embodiments, a polymer electrolyte precursor is used in a sequentially fabricated SBS battery. In this case, a first network of an active material is fabricated, and then a slurry comprised of the second active material and the liquid polymer precursor is introduced to the first network. If the first network is a foam, then the slurry can be infiltrated into the foam. If the first network is a coating, then the slurry can be coated on top of the coating.

A suitable polymer electrolyte precursor is a liquid at processing temperatures and is capable of crosslinking to form a solid polymer, in that a cubic centimeter of solid polymer does not flow under its own weight under time scales on the order of many days. In some embodiments in which a solid polymer electrolyte is produced via crosslinking, an ionic conductivity suitable for its intended use as an electrochemical cell is achieved by doping a salt into the precursor.

Exemplary polymer precursors include functionalized polyethers, e.g., polyethers based on poly(oxy methylene), poly(ethylene oxide), poly(propylene oxide) and their copolymers or terpolymers having crosslinkable groups, which may be terminal or distributed along the polymer chain. Useful materials for solid polymer electrolyte precursors are the acrylate and methacrylate esters of polyethers. When the monoester is chosen, it is preferable to have the other (hydroxyl) terminus of the polyether precursor capped with, for example, a methyl group. It has been found that acrylate and methacrylate esters of low molecular weight poly(ethylene glycol)s fulfill the requirements laid out above, namely having sufficient ionic conductivity and providing electrical isolation between the cathode and anode materials, as well as exhibiting low viscosity prior to crosslinking For example, a highly loaded (50 vol. %) spheroidal carbon slurry in di-acrylate or di-methacrylate-poly(ethylene glycol) forms a carbon particle network that is electrically isolated from a low refractive index, conductive substrate selected to be repulsive to the carbon particles.

Representative examples of polymer electrolyte precursors include, without limitation, poly(ethylene glycol) methyl ether methacrylate, poly(ethylene glycol) methyl ether acrylate, poly(propylene glycol) methyl ether methacrylate, and poly(ethylene glycol) phenyl ether acrylate, poly(ethyleneglycol)dimethacrylate (or diacrylate), poly(methyleneglycol) dimethacrylate (or diacrylate), poly(propyleneoxide) dimethacrylate (or diacrylate), and mixtures of any of the preceding compounds. Other representative polymer electrolyte precursors include vinyl-terminated polyethers that are reactive with silane compounds (i.e., compounds containing Si—H bonds) via hydrosilation reactions; and hydroxy terminated or hydroxy substituted polyethers that are reactive with isocyanates, blocked isocyanates, polyphenolics, melamine or melamine formaldehyde condensates, dicarboxylic acid compounds (or their derivatives) and diesters.

The solid polymer electrolyte precursors can also be crosslinked by means such as e-beam, X-ray, UV, and ionizing radiation, as is known in the polymer crosslinking art. Other means for crosslinking polyether precursors will be obvious to those skilled in the art, and are intended to be included herein.

The crosslinking agent is employed such that the final, crosslinked, solid polymer electrolyte has a range of molecular weights between crosslinks of about $30$-$10^6$ g/mol, or about $30$-$10^4$ g/mol, or about $30$-$10^2$ g/mol. Exemplary crosslinking agents include agents that decompose to form free-radicals, or that contain two or more carboxylic acids, or diisocyanates, melamines, phenolics, and melamine formaldehyde condensates, and the like. Crosslinking agents known in the art may be used in the practice of the invention.

The crosslinking agent is employed at an equivalent weight of about $30$-$10^6$ g/mol, or about $30$-$10^4$ g/mol, or about $30$-$10^3$ g/mol, where an equivalent weight is defined as the molecular weight of polymer between crosslinks. Exemplary crosslinking agents include agents containing two or more carboxylic acids, isocyanates, melanines, phenolics, and melanine formaldehyde condensates, and the like. Crosslinking agents known in the art may be used in the practice of the invention.

The crosslinking is initiated upon application of energy, such as heat, visible or UV energy, or x-ray, e-beam or gamma ray. A thermal or photo curing initiator can be added, depending on whether the polymer is to be crosslinked by photoreaction or thermally induced crosslinking or other energy source. Exemplary thermal initiators include, without limitation, azoisobutyronitrile (AIBN). Exemplary photoinitiators include, without limitation, H-Nu™ 635 and H-Nu™ 470 from Spectra Group, Cyracure™ products from Union Carbide, Sarcure™ products from Sartomer, and the like.

A lithium salt (or other salt) can be added to the electrolyte as is the practice in the art. The lithium salt can be added in the amount of about 3 to about 30 wt % or higher based on the weight of the polymer electrolyte. Representative lithium salts include $LiClO_4$, $LiCF_3SO_3$, $LiBF_4$, $LiPF_6$, $LiAsF_6$, and $Li(CF_3SO_2)_2N$, as well as other lithium or other salts used in conventional polymer electrolytes.

The prevailing focus of solid polymer battery research has been to increase the conductivity of the solid polymer electrolyte material. Although the electrochemical device described herein can benefit from the use of higher conductivity electrolyte, it is not required. Because the ionic conductance of the electrolyte determines transport rates, by decreasing the characteristic lithium ion diffusion length by a factor of >10, or by a factor of 100, as is possible using self-organizing particulate structures, the resulting devices can provide power densities at least equivalent to that of current laminated designs using liquid electrolytes, while using available solid polymer electrolytes. Thus, the smaller dimensions of the device components reduce the ionic conductivity demands of the device. The ionic conductivity is in the range of about $10^{-6}$ S/cm to about $10^{-4}$ S/cm; however, electrolytes having ionic conductivities of less than $10^{-4}$ S/cm at room temperature may be used. In some embodiments, electrolytes having ionic conductivities of less than $10^{-5}$ S/cm at room temperature may be used. An organic liquid electrolyte can be infiltrated into the crosslinked solid polymer electrolyte to provide or enhance lithium conductivity. Other additives can be infiltrated into the crosslinked solid polymer electrolyte to provide or enhance passivation of the electrolyte/active material interface as is known by those skilled in the art. The permeability of the polymer is sufficient to provide absorption of a liquid electrolyte or additive to enable required performance in an SBS battery or other self-organized bipolar electrochemical device.

The conductive compounds used as lithium storage materials (primarily transition metal oxides, carbon, or metal alloys) tend to have higher refractive indices and dielectric constants than organic compounds useful as the electrolyte. Thus, some otherwise desirable combinations of cathodes and anodes cannot achieve a negative $A_{123}$ using the intrinsic materials properties. A coating can be applied to any of the cathode materials or anode materials so that the combination results in appropriate repelling forces. That is, a coating can be applied to any of the cathode materials to provide a negative $A_{123}$. This is most typically achieved by altering the refractive index of the particle by selecting a coating having a suitable index value. In one or more embodiments, the coating is electronically and ionically conductive.

The electrode can be a lithium intercalating material. Representative electrode materials for use as the cathode include compounds based on LiCoO2, LiCoO2 doped with Mg, LiNiO2, LiMn2O4, LiMnO2, LiMnO2 doped with Al, LiFePO4, LiMnPO4, LixV6O13, Li2Fe2(SO4)3, V2O5, V6O11. Representative electrode materials for use as the anode include compounds based on carbon, amorphous carbon, graphite, mesocarbon microbeads, Li, LiAl, Li9Al4, Li3Al, Zn, LiZn, Ag, LiAg, Li10Ag3, B, Li5B4, Li7B6, Ge, Si, Li12Si7, Li21Si8, Li13Si4, Li21Si5, Sn, Li5Sn2, Li13Sn5, Li7Sn2, Li22Sn5, Sb, Li2Sb, Li3Sb, Bi, LiBi, Li3Bi, SnO2, SnO, MnO, Mn2O3, MnO2, Mn3O4, CoO, NiO, FeO, LiFe2O4, TiO2, LiTi2O4, and glass with a Sn—B—P—O compound.

The coating can be a polymer or polymer blend/mixture/solid solution, an inorganic glassy or crystalline compound, or a blend or admixture or composite or solid-solution of the two. The coating can also provide electronic or ionic conductivity. By way of example, the coating can be a conductive polymer or polymer blend that has dielectric and optical properties providing a negative A123. Polyaniline, polypyrrole, and their derivatives can be a constituent of such blends as a conductive constituent. As another example, the coating can contain a poly(o-methoxyaniline) or poly(3-octylthiophene) as a conductive constituent, and poly(tetrafluoroethylene) or poly(vinylidene fluoride) as an A123 modifying constituent, or blends thereof. As another example, the coating can be a glassy or crystalline oxide, or solid-solution or blend of oxides, that provide electronic and ionic conductivity while also providing a negative A123. According to the invention, methods such as sol-gel synthesis, or encapsulation from solutions and suspensions of such materials, are used to provide coatings. Vanadium oxides VxOy containing multivalent vanadium, and mixtures of vanadium oxide with low refractive index oxides such as boron oxide B2O3, silicon oxide, SiO or SiO2, or phosphorus pentoxide P2O5, are included amongst such coating materials. See, copending application U.S. Ser. No. 10/354,405, filed on Jan. 30, 2003, and entitled "Electrode and Related Devices" which is incorporated herein by reference.

Coating the storage particle permits a much wider range of storage materials to be used without being restricted to only those that have the dielectric and refractive index properties to provide $A_{123}<0$. Current collectors also may be coated, in this case to provide an attractive surface force between the collector and its electrode so that the electrode organizes preferably against its surface. In those embodiments where the current collector is coated to provide an attractive surface for one of the materials 1 or 3 (but not the other), suitable coatings include an electronically conductive material having the appropriate refractive index.

Applying the selection criteria described above, numerous combinations of materials 1, 2 and 3 can be selected, and such combinations can be determined.

The benefits of this invention include lower manufacturing cost, since less or no solvent is needed in the assembly process and potentially less residual stress is imparted to the device. The volume change during curing is less than that during drying/solvent extraction of a pure solvent-solution-based process. Use of such electrolytes leads to safer, longer lasting cells because of the absence of volatile and flammable liquid electrolytes, which can leak and often react with the highly reducing and oxidizing electrode materials. Furthermore, such batteries offer a greater shape flexibility, as they may not require heavy and expensive metal can packaging.

The following example are provided to illustrate the invention, which is not intended to be limiting of the invention, the scope of which is set forth in the claims which follow.

Example 1

Figure 5:
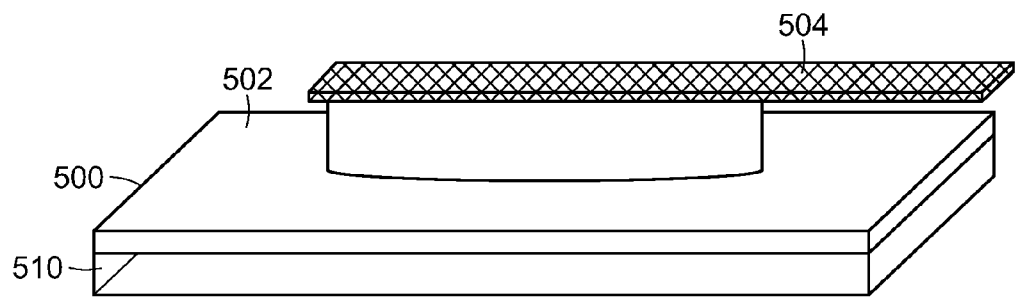
FIG. 5 is a schematic of the configuration used to demonstrate electrical isolation between a 50 vol. % glassy carbon bead electrode (balance crosslinkable polymer electrolyte) and a conductive substrate due to the in-situ separator formed by the crosslinkable polymer electrolyte.

Preparation of a Self-Organizing Battery Using a Crosslinked Polyethylene Glycol Dimethacrylate Solid Polymer Electrolyte Polyethylene glycol dimethacrylate (PEG-DMA, molecular weight 770) was used as the crosslinkable polymer electrolyte precursor, into which 10 wt. % $LiN(SO_2CF_3)_2$ salt was dissolved to instill Li ion conductivity, and 1 wt. % AIBN based on functional methacrylate was dissolved to act as initiator for the thermally induced crosslinking reaction. A mixing was conducted under glovebox conditions (Argon, <1 ppm $O_2$, <1 ppm $H_2O$.) Glassy carbon beads (sieved to 20 to 45 μm) were dispersed in the polymer/salt/initiator solution in the volume ratio 1:1 glassy carbon:PEG-DMA via mechanical stirring. A thin layer 500 of carbon/polymer/salt/initiator slurry was then cast onto a thin (5-10 μm) low refractive index conductive composite polymer film 502 on a substrate 510, as shown in FIG. 5. The conductive polymer film included a polytetrafluoroethylene (PTFE) latex acting as the low refractive index matrix material and 6.5 wt. % Baytron™ PH available from Bayer AG (a complex of poly(3,4-ethylenedioxythiophene) with polystyrenesulfonate in latex form) for providing electrical conductivity. This film formulation is designed to give high electrical conductivity (about 3 S/cm) while maintaining a bulk refractive index in the composite film that is less than that of the polymer electrolyte precursor system. Electrical connection to the carbon-polymer dispersion was made via a Cu mesh current collector 504 which was electrically isolated from the underlying conductive polymer composite film and to which glassy carbon experienced an attractive interaction in the crosslinkable polymer electrolyte. This assembly was left undisturbed for 20 minutes under glovebox conditions to allow the percolating network of carbon particles to form within the polymer electrolyte precursor system as well as to allow the particles near the surface of the conductive polymer composite substrate film 502 to separate from the film via repulsive van der Waals forces. The system was then placed in a 100° C. oven in a glovebox to crosslink for at least 20 minutes, after which the assembly is allowed to cool and electrical measurements are made. Table 1 illustrates the high resistance observed between the conductive film 502 and the current collector 504 using this chemistry in two separate experiments each containing 5 samples. Of ten samples total, 4 exhibited a resistance between the conductive carbon/crosslinked polymer electrolyte composite and the underlying conductive film of >1 MΩ, 5 had resistance between 100 kΩ and 1 MΩ, and only one exhibited a resistance less than 100 kΩ. High resistance across the electrochemical junction is an indication of electrical isolation between the two films. Moreover, the electrical conductivity of the anode particle network within crosslinked polymer was on the order of 1Ω. Low resistance within the carbon particle network indicates a high power density can be achieved for the battery. The composite of the crosslinked solid polymer electrolyte with the glassy carbon had sufficient strength/mechanical integrity to be handled freely after testing.

Example 2

Preparation of a Self-Organizing Battery Using a Crosslinked Polyethylene Glycol Diacrylate Solid Polymer Electrolyte Polyethylene glycol diacrylate (PEG-DA) was employed as the polymer electrolyte precursor (10 wt. % Li-TFMSI based on polymer electrolyte, 1 wt. % AIBN based on functional groups.) All other conditions were equivalent to those in Example 1. As shown in Table 1, of five samples produced, 2 exhibited a resistance between the conductive carbon/crosslinked polymer electrolyte composite and the underlying film of >1 MΩ, 2 had resistance between 100 kΩ and 1 MΩ, and 1 had a resistance <100 kΩ.

Example 3

Preparation of a Self-Organizing Battery Using a Crosslinked Diacrylate/Methacrylate Blend A blend of 80 wt. % methoxy(polyethylene glycol)methacrylate and 20 wt. % PEG-DA (80:20 MeOx-PEG-MA:PEG-DA) was employed as the polymer electrolyte precursor (10 wt. % Li-TFMSI based on polymer electrolyte, 1 wt. % AIBN based on functional groups.) All other conditions were equivalent to those in embodiment 1. As shown in Table 1, of five samples produced, all 5 exhibited a resistance between the conductive carbon/crosslinked polymer electrolyte composite and the underlying film of >1 MΩ.

TABLE 1

Summary of electrical isolation results between conductive carbon/crosslinked polymer electrolyte composite and the underlying conductive polymer film.

| Level of electrical isolation | PEG-DMA run 1 | PEG-DMA run 2 | PEG-DA | 80:20 MeOx-PEG-DA:PEG-DA |
|---|---|---|---|---|
| <100 kΩ | 1 | 0 | 1 | 0 |
| 100 kΩ-1 MΩ | 2 | 3 | 2 | 0 |
| >1 MΩ | 2 | 2 | 2 | 5 |
| Total | 5 | 5 | 5 | 5 |

What is claimed is:

1. A composition for use in the formation of an electronic device, comprising:
   a mixture of a liquid polymer precursor that is crosslinkable to form a solid polymer;
   at least one component of a first electrode; and
   at least one component of a second electrode, wherein the components of the first and second electrodes are selected to exert a repelling force on each other when combined with the polymer precursor; and
   wherein the first electrode has a refractive index $n_1$, the second electrode has a refractive index $n_3$, the liquid polymer precursor has a refractive index $n_2$, and $n_1 < n_2 < n_3$.

2. The composition of claim 1, wherein the composition has a viscosity of less than about 100000 cP.

3. The composition of claim 1, wherein the composition has a viscosity of less than about 10000 cP.

4. The composition of claim 1, wherein the composition has a viscosity of less than about 1000 cP.

5. The composition of claim 1, wherein the polymer precursor has a viscosity in the range of about 10 to 10000 cP.

6. The composition of claim 1, wherein the polymer precursor has a viscosity in the range of about 10 to 1000 cP.

7. The composition of claim 1, wherein the polymer precursor has a viscosity in the range of about 10 to 100 cP.

8. The composition of claim 1, wherein the at least one component of the first electrode is present at a % wt. solids in the range of about 10 to 80.

9. The composition of claim 1, wherein the at least one component of the second electrode is present at a % wt. solids in the range of about 10 to 80.

10. The composition of claim 1, wherein the polymer precursor comprises a crosslinkable poly(oxymethylene), poly(ethylene oxide), poly(propylene oxide), their mixtures, or their copolymers.

11. The composition of claim 1, wherein the polymer precursor comprises a hydroxy-terminated poly(ethylene glycol).

12. The composition of claim 1, wherein the composition further comprises a crosslinking agent.

13. The composition of claim 12, wherein the polymer precursor is crosslinkable with polyisocyanates, polyphenolics, melamine or melamine formaldehyde condensates.

14. The composition of claim 1, wherein the polymer precursor is vinyl terminated.

15. The composition of claim 1, wherein the polymer electrolyte precursor is crosslinkable upon application of heat.

16. The composition of claim 1, wherein the polymer precursor is crosslinkable upon application of visible or uv energy, x-ray, e-beam or gamma ray.

* * * * *